United States Patent [19]
Shah et al.

[11] Patent Number: 6,003,818
[45] Date of Patent: Dec. 21, 1999

[54] SYSTEM AND METHOD FOR UTILIZING STORED MOMENTUM TO OPTIMIZE SPACECRAFT SLEWS

[75] Inventors: Piyush R. Shah, Germantown, Md.; Douglas J. Bender, Redondo Beach; David S. Uetrecht, Palos Verdes, both of Calif.

[73] Assignee: Hughes Electronics Corporation, Los Angeles, Calif.

[21] Appl. No.: 09/038,022

[22] Filed: Mar. 11, 1998

[51] Int. Cl.$^6$ ....................................................... B64G 1/28
[52] U.S. Cl. ............................................................. 244/165
[58] Field of Search .................................... 244/164, 165, 244/169, 171; 701/13

[56] References Cited

U.S. PATENT DOCUMENTS

| | | |
|---|---|---|
| 3,998,409 | 12/1976 | Pistner .................................... 244/165 |
| 4,275,861 | 6/1981 | Hubert ..................................... 244/165 |
| 4,358,076 | 11/1982 | Lange et al. . |
| 5,035,381 | 7/1991 | Matthews . |
| 5,080,307 | 1/1992 | Smay et al. . |
| 5,255,879 | 10/1993 | Yocum et al. . |
| 5,257,802 | 11/1993 | Hablani .................................. 244/164 |

*Primary Examiner*—Galen L. Barefoot
*Attorney, Agent, or Firm*—Terje Gudmestad; Georgann Grunebach; Michael W. Sales

[57] ABSTRACT

A system and method for slewing a spacecraft with a reaction wheel system including determining initial total momentum, determining maximum forward and reverse rates that can be realized within the reaction wheel system maximum storage capacity, determining a slew rate and slew direction from the maximum forward and reverse rates so as to minimize slew time for known slew angles or maximize slew rate for arbitrary slew angles, and slewing the spacecraft.

10 Claims, 3 Drawing Sheets

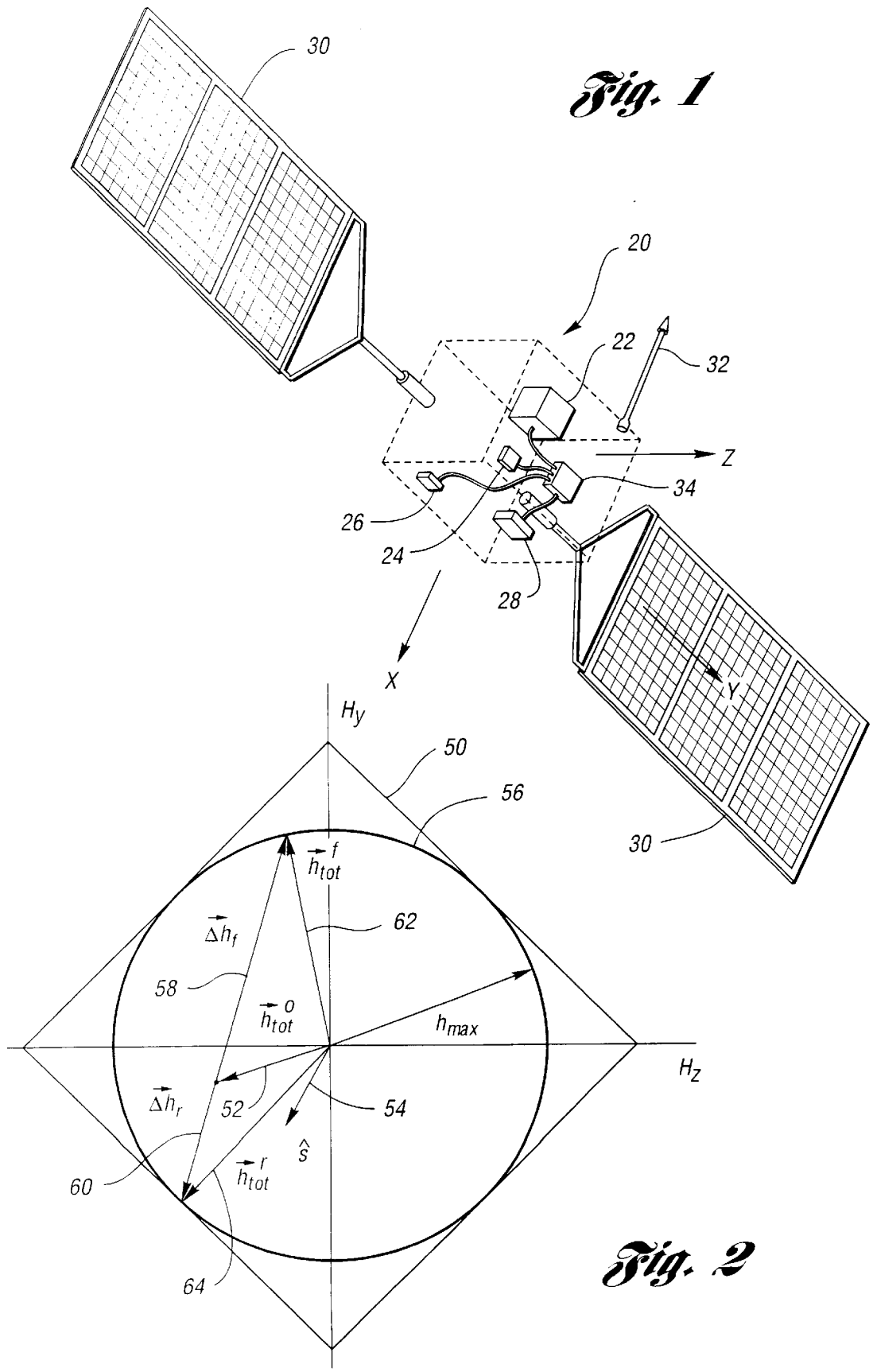

SYSTEM AND METHOD FOR UTILIZING STORED MOMENTUM TO OPTIMIZE SPACECRAFT SLEWS

TECHNICAL FIELD

The present invention relates in general to attitude control of a spacecraft and in particular to optimally selecting slew directions and rates based on stored momentum.

BACKGROUND ART

Throughout the life of a spacecraft, attitude modifications are made to carry out mission objectives, to determine orientation, and to correct for undesired torques. In order to minimize expendable fuel in slewing maneuvers, reaction wheel systems are used to transfer rotational momentum to and from the satellite body.

Current techniques for attitude control use predetermined slew directions, slew rates, or both, or try to minimize the slew angle. These techniques do not take into account the amount of stored momentum in determining slew direction and rate.

SUMMARY OF THE INVENTION

As such, one object of the present invention is to utilize stored momentum to select the slew direction and rate so as to minimize slew time.

Another object of the present invention is to reduce the cost and weight of a spacecraft due to a reduction in the size of reaction wheels.

In carrying out the above objects and other objects and features of the present invention, a method is provided for selecting the slew direction and rate to minimize slew times. Maximum rates in the forward direction and reverse direction respectively are determined such that the sum of the momentum required to produce the rate and the total spacecraft momentum prior to the slew fall within the maximum capacity of the reaction wheel system. The slew rate and slew direction are determined from the maximum forward rate and the maximum reverse rate so as to minimize slewing time. The spacecraft is then slewed about the slew axis in the determined slew direction at the determined slew rate.

One embodiment is used for an arbitrary slew angle. Determining the slew rate and slew direction includes setting the slew rate as the greater of the maximum forward rate and the maximum reverse rate, and determining the slew direction as the direction resulting in the maximum rate.

Another embodiment is used for a known slew angle. Determining the slew rate and slew direction includes determining the times required to slew with the maximum forward rate and maximum reverse rate. The maximum forward rate and forward direction are used if the maximum forward rate results in the minimum slew time. If not, the maximum reverse rate and reverse direction are used.

Another embodiment uses a sphere as the maximum allowed momentum envelope. The sphere has a radius equal to the minimum of the maximum momentum capacity in any direction.

A system is also provided in accordance with the present invention. The system includes a reaction wheel system, attitude sensors, rate sensors, and a control logic operable to read sensor information and a desired attitude and to command the reaction wheel system to develop torques so as to obtain the desired attitude.

The above objects and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 is a graphical representation of a spacecraft that may use the method according to the present invention;

FIG. 2 is a vector diagram illustrating an example in accordance with the present invention;

BEST MODE FOR CARRYING OUT THE INVENTION

Figure 3:
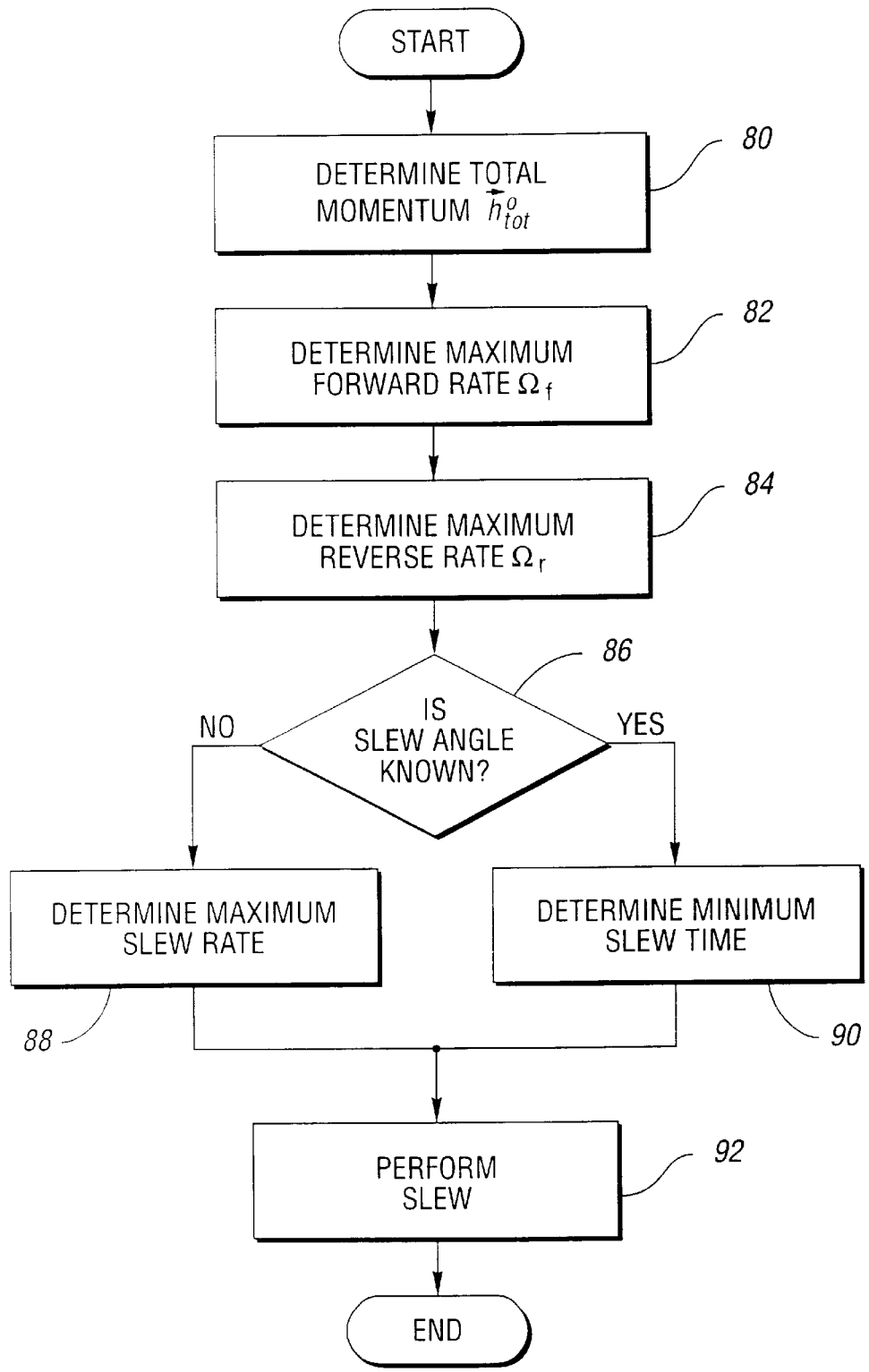
FIG. 3 is flow diagram representing operation of a system or method according to the present invention.

Referring now to FIG. 1, a graphical illustration of a spacecraft that may use the present invention is shown. Spacecraft 20 has an orthonormal reference frame indicated by x, y and z axes. A reaction wheel system 22 includes one or more reaction wheels and is operable to exchange rotational momentum between the wheels and the remainder of spacecraft 20 so as to modify the attitude of spacecraft 20.

Spacecraft 20 also includes sensors for determining attitude and rate. These may include an Earth sensor 24, a Sun sensor 26, and a gyroscope system 28. The method described by the present invention does not depend on the type of attitude and rate sensors, as will be appreciated by one of ordinary skill in the art.

Spacecraft 20 may also include appendages, such as solar wings 30 and antenna 32, that may have varying mass properties throughout a mission.

Control logic 34 is in communication with reaction wheel system 22, Earth sensor 24, Sun sensor 26 and gyroscope system 28, and is operative to read attitude and rate information, determine reaction wheel and spacecraft momentum, and affect attitude modifications according to the present invention.

Referring now to FIG. 2, a vector diagram illustrating an example of the present invention is shown. The diagram indicates rotational momentum in the y-z plane. Momentum in the z direction is indicated by horizontal axis $H_z$. Momentum in the y direction is indicated by vertical axis $H_y$. The present invention applies in general to momentum in all three spacial dimensions. A two-dimensional diagram is shown here for simplicity.

An envelope representing the maximum reaction wheel storage capacity is shown by 50. The shape of this envelope depends on the number, orientation, and capacity of wheels that comprise reaction wheel system 22. In general, the total momentum can be found by summing the momentum of spacecraft 20 components, as is expressed in Equation (1):

$$\vec{h}_{tot} \leq \mathbf{I}_{sc}\vec{\omega}_{sc} + \vec{h}_{wheel} + \vec{h}_{solar} + \vec{h}_{ant} \qquad (1)$$

where $I_{sc}$ is the spacecraft moment of inertia tensor, $\vec{\omega}_{sc}$ is the spacecraft rate of rotation, $\vec{h}_{wheel}$ is the momentum stored in reaction wheel system 20, and $\vec{h}_{solar}$ and $\vec{h}_{ant}$ are momentums for appendages such as solar wings 30 and antenna 32. The initial total momentum of spacecraft 20 is indicated by vector 52, $\vec{h}^{0}_{tot}$.

The spacecraft is to slew about an axis ŝ, shown as 54. In order to slew spacecraft 20 about ŝ, momentum is transferred from reaction wheel system 22 to spacecraft 20. This results in a change in momentum for reaction wheel system 22 expressed generally in Equation (2):

$$\Delta \vec{h} = I_{sc} \cdot \hat{w} \cdot \Omega \tag{2}$$

where $\Omega$ is the scalar slew rate. Several important notes can be drawn from Equation (2). First, increasing the change in momentum produces a corresponding increase in the slew rate for a given slew axis and moment of inertia and, therefore, the greatest slew rate is achieved when the change in momentum is as large as possible. Second, the direction of the change in momentum is given by a vector defined as the product of $I_{sc}$ and $\hat{s}$. Third, since rotation about a general slew axis can be in one of two directions, forward or reverse, the change in momentum vector may point in either of two opposite directions.

A maximum slew rate and a corresponding slew direction are to be determined such that the required momentum stays within the storage capacity of reaction wheel system 22. The following description represents one way to calculate a suboptimal solution. To simplify calculations, a sphere is inscribed within maximum reaction wheel storage capacity envelope 50. The radius of this sphere is designated $h_{max}$. A sphere is the best surface for accommodating a slew in any arbitrary direction. In FIG. 2, this sphere is shown as a circle for clarity.

A vector $\Delta \vec{h}_f$, shown as 58, indicates the change in momentum available to rotate spacecraft 20 in a forward direction while staying within momentum sphere 56. A vector $\Delta \vec{h}_r$, shown as 60, indicates the change in momentum available to rotate spacecraft 20 in a reverse direction while staying within momentum sphere 56. As previously noted, the slew rate is maximized when the change in momentum is greatest. Therefore, the greatest forward rate is obtained when the magnitude of a vector formed by adding the initial momentum, $\vec{h}^0_{tot}$, and the forward change in momentum, $\Delta \vec{h}_f$, is equal to the maximum momentum, $h_{max}$. Likewise, the greatest reverse rate is obtained when the magnitude of a vector formed by adding the initial momentum, $\vec{h}^0_{tot}$, and the reverse change in momentum, $\Delta \vec{h}_r$, is equal to the maximum momentum, $h_{max}$. Mathematically, this is expressed in Equation (3):

$$\left| \vec{h}^0_{tot} + \Delta \vec{h}_{f,r} \right| = h_{max} \tag{3}$$

where $\Delta \vec{h}_{f,r}$ is either the forward or the reverse change in momentum.

The square of the magnitude of the vector formed by summing the initial momentum and the change in momentum can be found by taking the dot product of the vector, as in Equation (4):

$$h^2_{max} = \left( \vec{h}^0_{tot} + \Delta \vec{h}_{f,r} \right) \cdot \left( \vec{h}^0_{tot} + \Delta \vec{h}_{f,r} \right) \tag{4}$$

where • is the dot product. Since the dot product is commutative, Equation (4) can be rewritten as Equation (5);

$$h^2_{max} = \vec{h}^0_{tot} \cdot \vec{h}^0_{tot} + 2\left( \vec{h}^0_{tot} \cdot \Delta \vec{h}_{f,r} \right) + \Delta \vec{h}_{f,r} \cdot \Delta \vec{h}_{f,r} \tag{5}$$

Substituting Equation (2) into Equation (5) yields Equation (6):

$$h^2_{max} = \vec{h}^0_{tot} \cdot \vec{h}^0_{tot} + 2\left( \vec{h}^0_{tot} \cdot \vec{i}_s \right) \Omega_{f,r} + \left( \vec{i}_s \cdot \vec{i}_s \right) \Omega^2_{f,r} \tag{6}$$

where $\vec{i}_s$ is a vector defined as the product of $I_{sc}$ and $\hat{s}$ and $\Omega_{f,r}$ is either the forward or reverse angular rate.

Equation (6) is a quadratic in $\Omega$ which, when solved, yields two solutions, a forward rate $\Omega_f$ and a reverse rate $\Omega_r$. The forward rate is expressed in Equation (7):

$$\Omega_f = \left| \frac{-\left(\vec{h}^0_{tot} \cdot \vec{i}_s\right) - \sqrt{\left(\vec{h}^0_{tot} \cdot \vec{i}_s\right)^2 - \left(\vec{i}_s \cdot \vec{i}_s\right) \cdot \left(\vec{h}^0_{tot} \cdot \vec{h}^0_{tot} - h^2_{max}\right)}}{\left(\vec{i}_s \cdot \vec{i}_s\right)} \right| \tag{7}$$

The reverse rate is expressed in Equation (8):

$$\Omega_r = \left| \frac{-\left(\vec{h}^0_{tot} \cdot \vec{i}_s\right) + \sqrt{\left(\vec{h}^0_{tot} \cdot \vec{i}_s\right)^2 - \left(\vec{i}_s \cdot \vec{i}_s\right) \cdot \left(\vec{h}^0_{tot} \cdot \vec{h}^0_{tot} - h^2_{max}\right)}}{\left(\vec{i}_s \cdot \vec{i}_s\right)} \right| \tag{8}$$

The total momentum required to slew spacecraft 20 about axis $\hat{s}$ in the forward direction at rate $\Omega_f$ is $\vec{h}^f_{tot}$, shown as vector 62 in FIG. 2. The total momentum required to slew spacecraft 20 about axis $\hat{s}$ in the reverse direction at rate $\Omega_r$ is $\vec{h}^r_{tot}$, shown as vector 64 in FIG. 2.

Although a sphere is inscribed within maximum reaction wheel system storage capacity envelope 50 to simplify rate calculations, this is not a requirement. Envelope 50 may be used to calculate maximum forward and reverse rates within the spirit of this invention. In this embodiment, the maximum forward rate would be determined such that a vector formed by the sum of initial momentum and the forward change in momentum has a length such that the vector magnitude equals the envelope value at a point where the vector touches the envelope. The reverse rate is determined in a similar fashion.

When calculating the momentum-allowed slew rates, it must be taken into account that the initial spacecraft momentum will remain fixed in the inertial space and, therefore, will rotate within spacecraft 20 as spacecraft 20 slews. The sum of the momentum for slewing and the inertial momentum must not exceed the storage capacity of wheel system 22. This constraint can be met by keeping the total momentum within a sphere or any other geometrical shape which is symmetrical about the slew direction $\hat{s}$ and contained within total momentum envelope 50.

In another embodiment of the present invention, the desired slew rate and direction are known. The method of the present invention may then be used to determine the maximum reaction wheel capacity as can be seen by one of ordinary skill in the art.

Referring now to FIG. 3, a flow diagram of the present invention is shown. As will be appreciated by one of ordinary skill in the art, the control operations illustrated are not necessarily sequential operations. Similarly, control operations may be performed by software, hardware, or a combination of both. The present invention transcends any particular implementation and is shown in a sequential flow chart form for ease of illustration.

The initial total momentum $\vec{h}^0_{tot}$ is determined 80. The total momentum may be found from the commanded states for the spacecraft, wheel system and appendages.

The maximum forward rate $\Omega_f$ and maximum reverse rate $\Omega_r$ are determined as shown in blocks 82 and 84 respectively. Calculations for maximum forward and reverse rates are discussed with regards to FIG. 2 above.

Determining slew rate and direction depend on whether or not the slew angle is know as shown in block 86. The slew angle may not be known prior to the maneuver if, for example, the slew is part of a procedure searching for a celestial body such as the Sun or the Earth from an arbitrary starting angle.

If the slew angle is not known, the maximum rate is determined 88. In this case, the slew rate is selected to be the maximum rate corresponding to the forward or reverse direction so as to minimize the expected slew time. The maximum command rate can be expressed by Equation (9):

$$\vec{\omega}_{max}^{slew} = \max(\Omega_f, \Omega_r) \cdot \text{sign}\left(\vec{h}_{tot}^0 \cdot \vec{i}_s\right) \cdot \hat{s} \qquad (9)$$

If the slew angle is known, the minimum slew time is determined 90. If slew angle θ, defined as a positive rotation about the slew axis, is given, the optimal slew direction and rate are determined so as to minimize the slew time. In one embodiment, acceleration and deceleration times are ignored, yielding a forward slew time $t_f$ defined by Equation (10):

$$t_f = \frac{\theta}{\Omega_f} \qquad (10)$$

The reverse slew time $t_r$ is likewise defined by Equation (11):

$$t_r = \frac{2\pi - \theta}{\Omega_r} \qquad (11)$$

The minimum of $t_f$ and $t_r$ determines whether the forward or reverse rate and direction are chosen.

The slew is performed 92, the direction and rate having been determined so as to either maximize the slew rate or minimize the slew time without exceeding the capacity of reaction wheel system 22.

Figure 4:
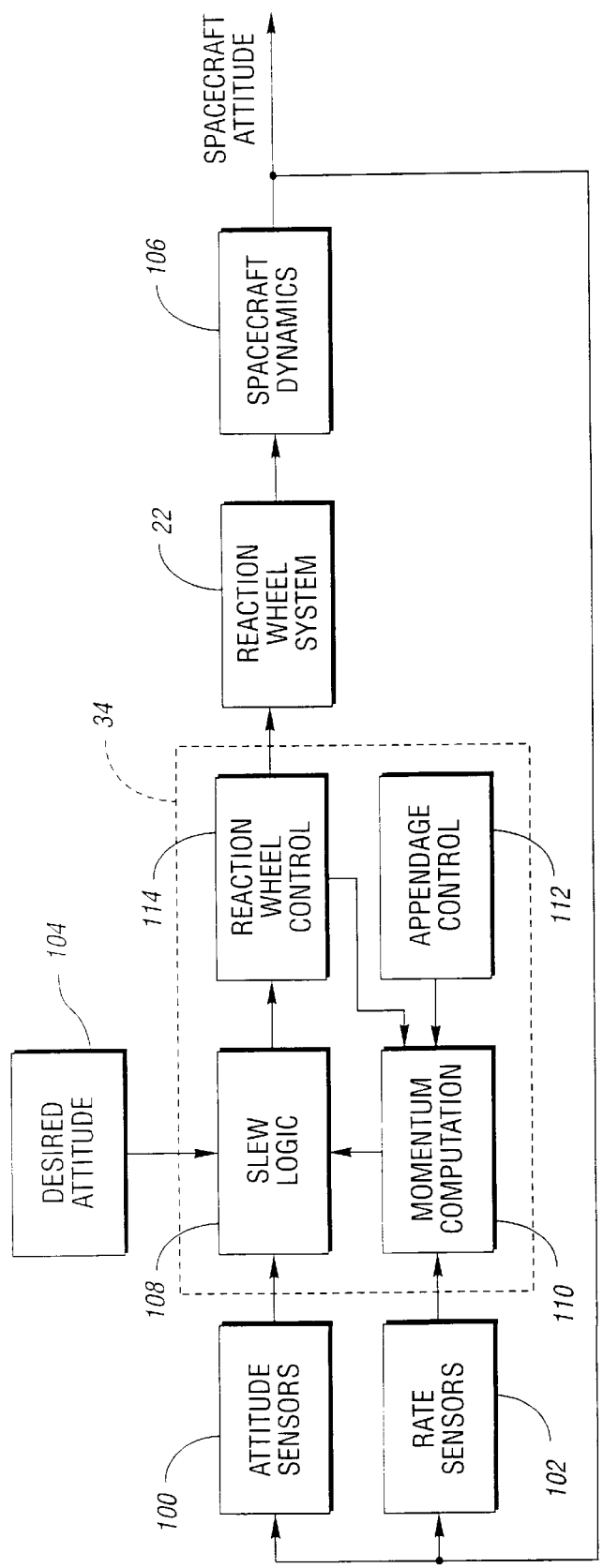
FIG. 4 is a block diagram of a control arrangement for effecting a spacecraft maneuver in accordance with the present invention is shown.

Referring now to FIG. 4, a block diagram of a control arrangement for effecting a spacecraft maneuver in accordance with the present invention is shown.

Control logic 34 accepts attitude measurements from attitude sensors, shown generally as block 100, rotational rate measurements from rate sensors, shown generally as block 102, and desired attitude signals, shown as block 104. The desired attitude signals may be commanded from a ground station not shown or may be produced from an on-board algorithm. Control logic 34 develops wheel torque commands for reaction wheel system 22. These commands create wheel torques that modify the attitude of spacecraft 20 through spacecraft dynamics, shown generally by block 106.

Within control logic 34, slew logic 108 accepts measured attitudes from attitude sensors 100, desired attitudes 104, and spacecraft total momentum from momentum computation 110, and determines a slew rate and direction as described with regards to FIGS. 2 and 3 above. Momentum computation 110 uses spacecraft rate measurements from rate sensors 102, appendage rates from appendage control 112, and wheel rates from reaction wheel control 114 to determine the total rotational inertia. Reaction wheel control 114 uses slew rate and direction from slew logic 108 to determine wheel torque commands.

While the best mode for carrying out the present invention has been described in detail, and several alternative embodiments have been presented, those familiar with the art to which this invention relates will recognize various alternative designs and embodiments within the scope and spirit of the present invention as defined by the following claims.

What is claimed is:

1. A method of slewing a spacecraft about a slew axis, wherein the spacecraft has a reaction wheel system, and wherein the reaction wheel system has a maximum storage capacity that may be dependent on momentum direction, the method comprising:

determining a maximum forward rate in a forward direction such that the change of momentum required to achieve the maximum forward rate can be realized within the reaction wheel system maximum storage capacity;

determining a maximum reverse rate in a reverse direction such that the change of momentum required to achieve the maximum reverse rate can be realized within the reaction wheel system maximum storage capacity;

determining the slew rate and slew direction from the maximum forward rate and the maximum reverse rate; and slewing the spacecraft about the slew axis in the slew direction at the slew rate.

2. The method of slewing a spacecraft as in claim 1, wherein the angle of the slew is not known prior to the slew, the step of determining the slew rate and slew direction comprising:

determining the maximum of the maximum forward rate and the maximum reverse rate;

determining the slew rate as the maximum of the maximum forward rate and the maximum reverse rate; and determining the slew direction as the direction resulting in the maximum of the maximum forward rate and the maximum reverse rate.

3. The method of slewing a spacecraft as in claim 1, wherein the angle of the slew in known prior to the slew, the step of determining the slew rate and slew direction comprising:

determining the time required to slew in the forward direction using the maximum forward rate;

determining the time required to slew in the reverse direction using the maximum reverse rate;

determining the slew rate as the maximum forward rate if the time required to slew in the forward direction is less than the time required to slew in the reverse direction, otherwise determining the slew rate as the maximum reverse rate; and determining the slew direction as the forward direction if the maximum forward rate is determined as the slew rate, otherwise determining the slew direction as the reverse direction.

4. The method of slewing a spacecraft as in claim 1, the step of determining a maximum forward rate comprising:

determining an envelope representing maximum allowed momentum in any momentum direction in the reaction wheel system;

determining the initial total momentum; and determining a maximum forward rate such that the magnitude of a vector defined as the sum of the change in momentum required to achieve the maximum forward rate and the initial total momentum is equal to the value of the maximum allowed momentum envelope at a point on the envelope touched by the vector.

5. The method of slewing a spacecraft as in claim 1, the step of determining a maximum reverse rate comprising:

determining an envelope representing maximum allowed momentum in any momentum direction in the reaction wheel system;

determining the initial total momentum; and determining a maximum reverse rate such that the magnitude of a vector defined as the sum of the change in momentum required to achieve the maximum reverse rate and the initial total momentum is equal to the value of the maximum allowed momentum envelope at a point on the envelope touched by the vector.

6. The method of slewing a spacecraft as in claims 4 or 5, the step of determining an envelope representing maximum allowed momentum comprising determining a sphere such that the radius of the sphere is equal to the minimum of the maximum storage capacity of the reaction wheel system in any momentum direction.

7. A system for slewing a spacecraft about a slew axis so as to attain a desired attitude, the system comprising:

a reaction wheel system, wherein the reaction wheel system is operable to slew the spacecraft about the slew axis, and wherein the reaction wheel system has a maximum storage capacity that may be dependent on momentum direction; and a control logic in communication with the reaction wheel system, the control logic operable to (a) determine a maximum forward rate in a forward direction such that the change in momentum required to achieve the maximum forward rate can be realized within the reaction wheel system maximum storage capacity;

(b) determine a maximum reverse rate in a reverse direction such that the change in momentum required to achieve the maximum reverse rate can be realized within the reaction wheel system maximum storage capacity;

(c) determine the slew rate and slew direction from the maximum forward rate and the maximum reverse rate; and (d) slew the spacecraft about the slew axis in the slew direction at the slew rate.

8. The system for slewing a spacecraft as in claim 7, wherein the angle of the slew is not known prior to the slew, the control logic further operable to (a) determine the maximum of the maximum forward rate and the maximum reverse rate;

(b) determine the slew rate as the maximum of the maximum forward rate and the maximum reverse rate; and (c) determine the slew direction as the direction resulting in the maximum of the maximum forward rate and the maximum reverse rate.

9. The system for slewing a spacecraft as in claim 7, wherein the angle of the slew is known prior to the slew, the control logic further operable to (a) determine the time required to slew in the forward direction using the maximum forward rate;

(b) determine the time required to slew in the reverse direction using the maximum reverse rate;

(c) determining the slew rate as the maximum forward rate if the time required to slew in the forward direction is less than the time required to slew in the reverse direction, otherwise determine the slew rate as the maximum reverse rate; and (d) determine the slew direction as the forward direction if the maximum forward rate is determined as the slew rate, otherwise determine the slew direction as the reverse direction.

10. The system for slewing a spacecraft as in claim 7, wherein the reaction wheel system has an envelope representing maximum allowed momentum in any momentum direction, the control logic further operable to (a) determine the initial total momentum;

(b) determine a maximum forward rate such that the magnitude of a first vector defined as the sum of the change in momentum required to achieve the maximum forward rate and the initial total momentum is equal to the value of the maximum allowed momentum envelope at a point on the envelope touched by the first vector; and (c) determine a maximum reverse rate such that the magnitude of a second vector defined as the sum of the change in momentum required to achieve the maximum reverse rate and the initial total momentum is equal to the value of the maximum allowed momentum envelope at a point on the envelope touched by the second vector.

* * * * *